United States Patent [19]

Johansson

[11] Patent Number: 4,871,509

[45] Date of Patent: Oct. 3, 1989

[54] FUEL COLUMN RETAINER USING RADIALLY COMPRESSED SPRING

[75] Inventor: Eric B. Johansson, San Jose, Calif.

[73] Assignee: General Electric Company, San Jose, Calif.

[21] Appl. No.: 189,443

[22] Filed: May 2, 1988

[51] Int. Cl.[4] .............................................. G21C 3/00
[52] U.S. Cl. ................................... 376/412; 376/418; 376/420; 376/451
[58] Field of Search ................ 376/412, 418, 420, 451

[56] References Cited

U.S. PATENT DOCUMENTS

| | | | |
|---|---|---|---|
| 3,274,067 | 9/1966 | Greebler | 376/420 |
| 3,899,392 | 8/1975 | Grossman | 376/412 |
| 3,963,566 | 6/1976 | MacMillan | 376/412 |
| 4,587,092 | 5/1986 | Feutrel | 376/438 |
| 4,642,217 | 2/1987 | Wilson | 376/451 |
| 4,699,757 | 10/1987 | Cloue | 376/412 |

Primary Examiner—Donald P. Walsh
Attorney, Agent, or Firm—Robert R. Schroeder

[57] ABSTRACT

A spring retainer is disclosed for use in retaining fuel pellets in a fuel rod both during fabrication and shipment to prevent the fuel pellets from being moved from their design location before installation within a reactor. The cylindrical and solid nuclear pellets containing the reactor fuel are placed within the fuel rods (or cladding) and have an outside diameter slightly less than the inside diameter of the fuel rod. Once the pellets are in place, a two-part spring holder is inserted into the end of the fuel rod. A first compression spring part of the coil spring holder is a conventional coil spring which, acting in compression, bears against the fuel pellets with a preselected force typically forcing the pellets when in the horizontal position into a compacted disposition when the fuel rod is horizontal. This conventional coil spring has a diameter which is less than the inside diameter of the fuel rod. A second locking spring part of the coil spring holder is a coil spring having a diameter which exceeds the inside diameter of the fuel rod. This helical locking spring is spirally wound down to an outside diameter less than that of the inside diameter of the fuel rod for insertion into the rod and released to key to the inside diameter of the rod. Winding occurs through a special tool which attaches to the respective ends of the coil spring.

10 Claims, 2 Drawing Sheets

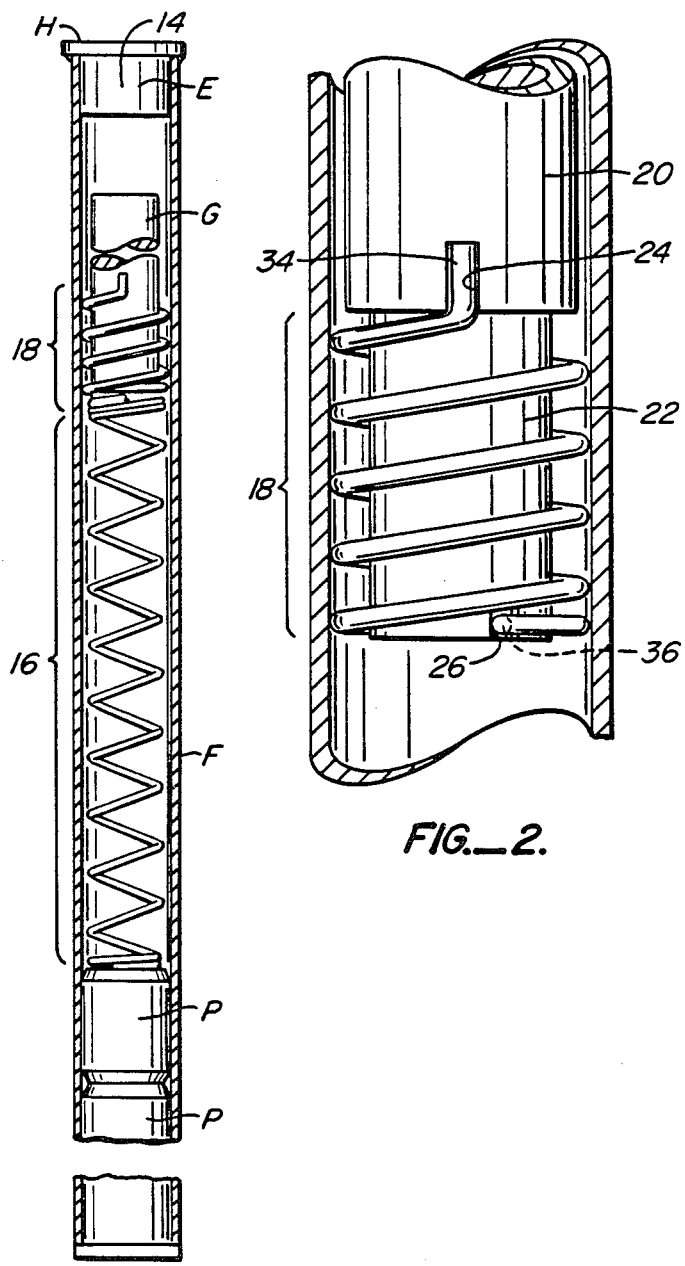
FIG.—1.
FIG.—2.

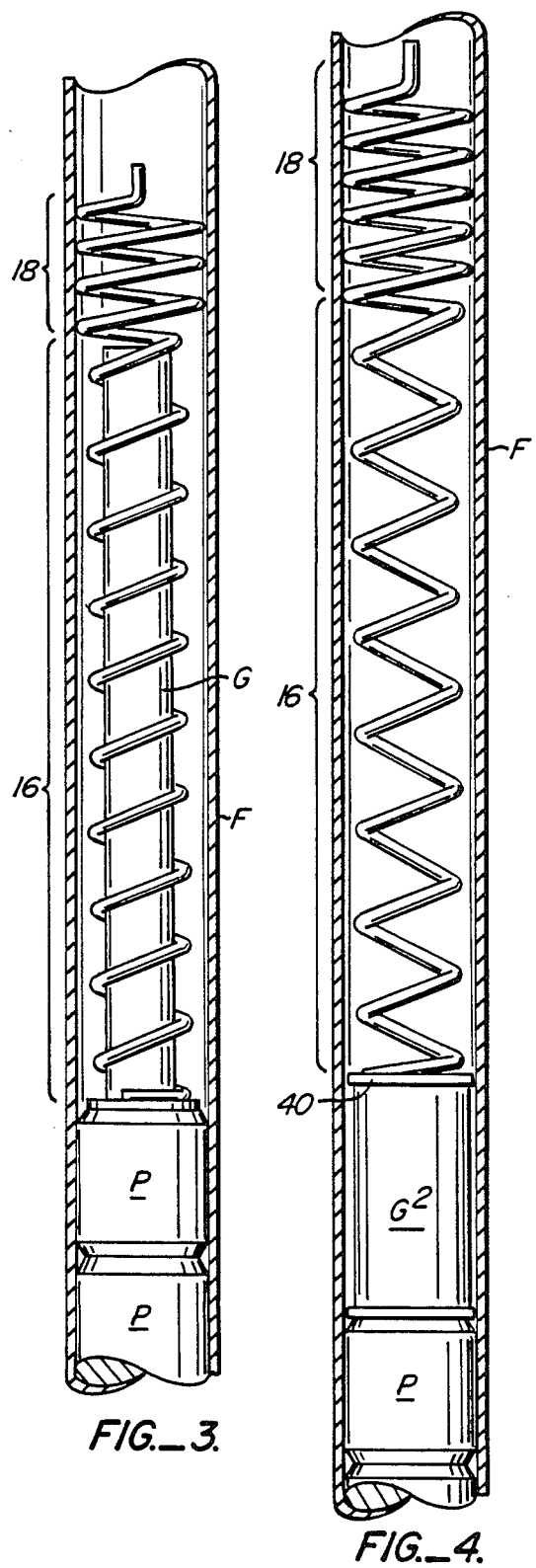
FIG._3.   FIG._4.
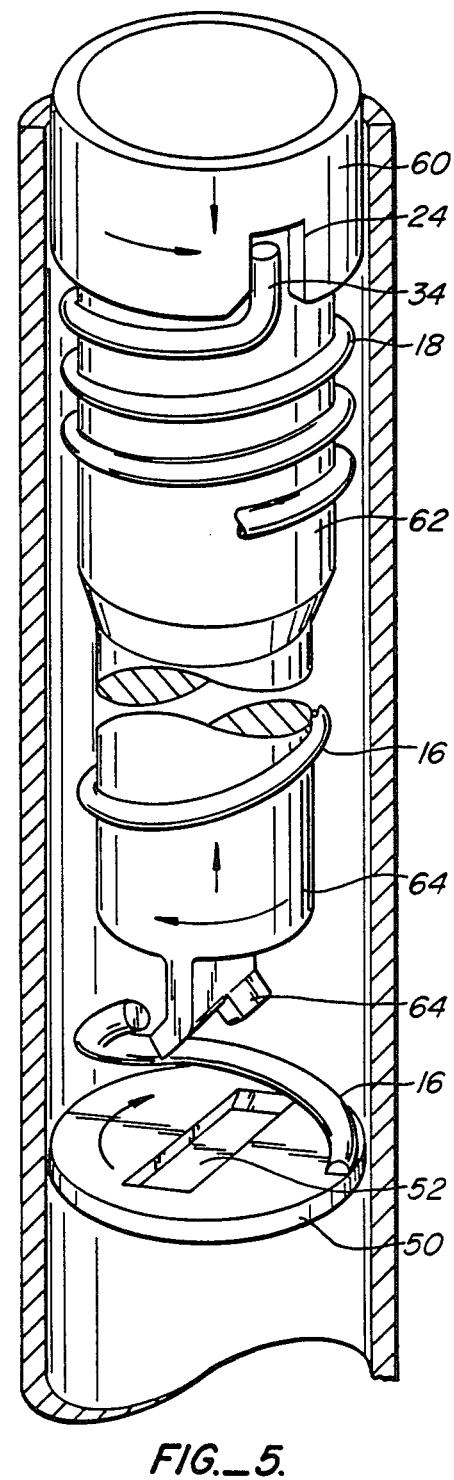
FIG._5.

4,871,509

FUEL COLUMN RETAINER USING RADIALLY COMPRESSED SPRING

BACKGROUND OF THE INVENTION

This invention relates to fuel rods. More particularly, a spring clamp for maintaining fuel pellets compressed within a fuel rod during both manufacture and shipment is disclosed.

SUMMARY OF THE PRIOR ART

Fuel rods having fuel pellets contained therein are basic elements in a nuclear reactor. Typically, the so-called "fuel rod" includes a Zircaloy cylinder loaded with cylindrical uranium or plutonium fuel pellets. The cylindrical fuel pellets have an outside cylindrical diameter less than the inside diameter of the cylindrical and hollow Zircaloy rod into which they are placed. A fuel rod is typically on the order of 165-inches long and, dependent upon the designed fuel load, has between 140 and 150-inches of its total length occupied by the fuel pellets.

The fuel rod is typically plugged and sealed at both ends. Usually, one end of the rod is plugged first. Thereafter, the fuel pellets are installed. A retainer spring is then inserted to bias the fuel pellets to the plugged end of the fuel rod.

A cylindrical canister filled with Zirconium alloy chips and having holes in its ends is also installed. The Zirconium alloy chips absorb any hydrogen which may be present in the fuel rod. If free hydrogen were present it would be absorbed by the fuel rod tubing and would embrittle the tubing. The canister and the Zirconium alloy chips are referred to as a "getter".

Next, the second plug is held in place and welded to the fuel rod tube. This second plug compresses the spring, so that an axial force is required to hold it in place during the welding operation.

Next the gases present in the fuel rod are pumped out through a small hole and the fuel rod is back filled with helium. Helium pressure is typically between one and ten atmospheres (14.7 to 147 pounds per square inch). The fuel rod is then sealed.

The sealed fuel rod contains the fuel pellet column, the retainer spring, and the getter. The remaining volume is initially occupied by the helium fill gas. During reactor operation, inert gases xenon and krykton are produced as a byproduct of the nuclear fission process. These gases must also be contained in the volume initially occupied by the helium fill gas.

As the inert gases accumulate, the pressure rises. Typically, end of life pressures are in the range of 1,000 to 3,000 pound per square inch. To minimize this pressure, it is desirable to minimize the volume occupied by the retainer spring.

In anticipation of the pressure ultimately to be encountered, the fuel rods are dimensioned and plugged at both ends. The rods are given a cylindrical side wall dimension that will not burst or crack under pressure of the accumulated gas. Moreover, Zircaloy plugs are welded at each end of the rods. These plugs are welded in gas tight relationship to prevent gas escape. In short, a fuel rod nearing the end of its life in a nuclear reactor is, among other things, a pressure vessel constructed to contain gases under high pressure and temperature.

When the fuel rods are initially fabricated they are loaded with their pellets while horizontally disposed. Further, when the loaded rods are moved, they are also horizontally disposed. The rods on their side are moved from place to place while the steps required for the ultimate fabrication are completed.

During such horizontally disposed movement, there is always a danger that the relatively heavy pellets will move from a compacted position (to and towards the bottom of the fuel rod) into a non-compacted position occupying the gas space at the top of the rod.

During shipment from the site of fabrication to the nuclear reactor where the rods are ultimately placed in a fuel bundle and utilized, the rods are typically placed on their side. If the fuel pellets are not restrained, movement of the pellets from a compacted disposition into the gas space can take place.

When the rods are installed within a reactor, they are disposed vertically. If the fuel column has gaps, these gaps will not close, because of pellet wedging and friction. The presence of axial gaps would lead to undesirable consequences.

Specifically, reactors operate under pressure in the range of 1,000 psi. It will be remembered that initially the pressure on the inside of the rods was in the order of 200 psi. If a pellet or pellets are out of their required stacked and end to end relationship when a fuel rod is installed, the rod in the area of pellet separation can neck down under the pressure of the reactor and hold the pellet out of place. Such a phenomenon can occur where one pellet when moved out of place becomes canted at an angle. The pellet can then wedge itself to the inside diameter of the rod and remain spatially separated from its adjacent pellets. In such a case, the unoccupied volume on the inside of the fuel rod can neck down initially under the pressure of the reactor.

Two consequences follow from a rod with fuel pellets out of place.

First, the axial power distribution is altered to give high local powers near the axial gap in the fuel column. The high local power cause local overheating of the fuel rod.

Second, overstressing or cracking of the fuel rod can occur.

In view of these difficulties, the prior art has included a spring in the fuel assemblies. The spring bears against the welded end plug at one end of the rod. The spring also bears against the adjacent fuel pellet at the end of the fuel rod.

Typically, the spring is configured to either contain or bear against the getter. In any event, the spring exerts a force tending to keep the fuel pellets compacted towards one end of the fuel rod after the ends of the rod are sealed.

Statement of the Problem

This type of spring assembly—after having been closely analyzed in an effort to achieve this improved design—has been noted to include at least five problems.

First, the spring extends from the last fuel pellet to the end plug of the fuel rod. This occupancy of the full length—in the order of 12-inches—adds to the volume of the spring and reduces the volume available for the fuel column and for the gases produced by nuclear fission events in the fuel pellets.

Second, the spring is a neutron absorber. Neutrons—which might otherwise be used in the desired chain reaction—are absorbed and lost when they come into contact with the excess mass of material of the spring.

Third, the full volume between the end plug and the fuel pellets varies in length. Consequently, the length configuration of the springs used for various lengths of pellet loading must vary. In short, different fuel designs require different springs—a complicating factor in the production of fuel rods.

Fourth, the spring installation is one of the last steps in the fuel rod fabrication. During earlier fabrication steps, the spring is not present, and there is a possibility of opening gaps between pellets in the fuel column.

Finally, the end of the spring adjacent the end plug bears against the end plug while welding occurs. An axial force is required to hold the end plug in position. Further, this portion of the spring is in the area highly heated by the weld. The heat of the weld can change the spring characteristics.

It will be understood that recognition of a problem can constitute invention. Insofar as this recognition constitutes invention invention is claimed.

SUMMARY OF THE INVENTION

A spring retainer is disclosed for use in retaining fuel pellets in a fuel rod both during fabrication and shipment to prevent the fuel pellets from being moved from their design location before installation within a reactor. The cylindrical and solid nuclear pellets containing the reactor fuel are placed within the fuel rods and have an outside diameter sightly less than the inside diameter of the fuel rod. Once the pellets are in place, a two-part spring holder is inserted into the end of the fuel rod. A first compression spring part of the coil spring holder is a conventional coil spring which, acting in compression, bears against the fuel pellets with a preselected force typically forcing the pellets when in the horizontal position into a compacted disposition when the fuel rod is horizontal. This conventional coil spring has a diameter which is less than the inside diameter of the fuel rod. A second locking spring part of the coil spring holder is a coil spring having a diameter which exceeds the inside diameter of the fuel rod. This helical locking spring is spirally wound down to an outside diameter less than that of the inside diameter of the fuel rod for insertion into the rod, and then released to key to the inside diameter of the rod. Winding occurs through a special tool. By winding one end of the locking coil spring relative to the other end of the locking coil spring, spiral winding of the helical spring to a diameter less than the inside diameter of the rod occurs. Installation includes winding the locking spring, inserting the wound locking spring, compressing the installed fuel pellets with the compression spring, and releasing the spirally wound helical locking spring to unwind the locking spring so that it keys to the inside walls of the fuel rods. The disclosed design accommodates conventional fuel getters and is shown with a preferred one piece construction where the compression and locking spring sections are fabricated from the same single piece of wire.

Other Objects, Features and Advantages

An object of this invention is to disclose a simplified two-part spring clamp for retaining fuel pellets under compression within a fuel rod. A spring having two sets of helical coils is disclosed. The first set of coils is a compression spring bearing against the fuel pellets. The second set of coils is a locking spring having a diameter which exceeds the inside diameter of the fuel rod. This helical locking spring is spirally wound down to an outside diameter less than the inside diameter of the fuel rod. As wound, it is inserted with compression spring disposed to and toward the fuel pellets. The fuel pellets are compressed by the compression spring. When the fuel pellets come under the desired compression, the locking spring is released, and keys to the inside rod walls with securing of the fuel pellets in place under compression occurring.

An advantage of the disclosed two-part spring clamp is that it occupies the minimal volume within the fuel rod. No longer need the spring extend between the last pellet and the end plug. Instead the spring can occupy a relatively short distance on the order of 2 to 4 inches.

Second, the new spring introduces a minimum amount of metal into the fuel rod. Not only is the spring clamp less expensive than those contacting the end plug but additionally a smaller volume of metal is present for the undesired adsorption of neutrons.

Third, the new spring accommodates variation in the total length of pellets used within the fuel rod. One spring design can be used for all loads of fuel pellets—short or long.

Fourth, the new spring is inserted immediately after insertion of the fuel pellets. Then the pellets are restrained during subsequent fabrication steps.

Finally, the clamp keying to the side walls of the fuel cladding or rod, no longer bears against the end plug. As no force is now exerted against the end plug, it is no longer necessary to overcome a force during welding to permit sealing of the end plug. Further, the clamp keys to the side walls of the fuel rod remote from the site of the welding. This being the case, the heat of the weld does not adversely affect the metallic properties of the clamp.

A further object to this invention is to disclose a process and apparatus for the installation of the clamp. According to this aspect of the invention, at least the second part of the coil spring which has a diameter which exceeds the inside diameter of the fuel rod, is wound to a smaller diameter while the spring is inserted into the fuel rod. This helical spring is spirally wound down to an outside diameter less than the inside diameter of the fuel rod by a tool exerting a spirally winding torsional force. Thereafter, the wound spring and its depending conventional compression coil spring member are inserted into the rod. Forced insertion is continued to achieve the designed compressive force on the fuel pellets—a force in the order of 7 pounds. Once this force is achieved, the wound spring is released. The released spring keys to the inside diameter of the cylindrical cladding walls. Securing of the pellets occurs.

An advantage of the disclosed process is that it is simple and remote. It is easily done by those having minimum skill.

A further advantage of the process is that the force of spring compression on the pellets is readily measured. Thus, precise precompression of the pellets can occur when the clamp keys to the inside diameter of the fuel rod before the rod is sealed.

Yet another advantage of the process is that the spring, once in place, secures the pellets. This securing occurs long before the ends of the rod are sealed. Not only is there an absence of a force tending to push on the end plug as it is welded, but from the moment of time that the spring clamp is placed, the pellets are under the desired compressive load.

BRIEF DESCRIPTION OF THE DRAWINGS

Other objects, features, and advantages of this invention will become more apparent after referring to the following specification and attached drawings in which:

FIG. 1 is a side elevation of a fuel rod illustrating from bottom to top the fuel pellets, the compression portion of the spring, the locking portion of the spring, a contained getter, and fuel rod end plug;

FIG. 2 illustrates the winding of the spring clamp of FIG. 1;

FIGS. 3 and 4 illustrate a one piece fuel column retainer.

FIG. 3 illustrates the placement of the getter interior of the coil compression spring;

FIG. 4 illustrates placement of the getter between the top of the fuel column and the compression spring;

FIG. 5 shows the one piece retainer together with its installation tool. The basic installation method is the same. In this case the inner shaft of the installation tool extends through the locking spring and the compression spring, and engages a washer welded to the bottom of compressing spring;

Referring to FIG. 1, a fuel rod F is illustrated at the top portion only. The fuel rod has pellets P confined in the lower portion of rod F. An end plug E is welded at welds 14 to the end of the rod F.

The spring has two active portions. The first portion is a conventional coil compression spring 16. Coil compression spring 16 is in the order of 2.5 inches long.

The second portion of the clamp is a locking coil spring portion 18.

Coil spring 16 differs from coil spring 18. Coil spring 16 has an inside diameter less than the inside diameter of the cylindrical cladding F. Hence the coil spring can conventionally act under compression on the fuel pellets F. The locking spring 18 originally had a diameter exceeding the inside diameter of of the coil F.

Insertion will, for the moment, be summarized. Typically, the locking spring 18, a helical spring, is spirally wound. It is wound in a direction that tends to bend and decrease its diameter. Winding continues until spring 18 has an outside diameter which is less than the inside diameter of the rod or cladding F.

Insertion of the spring occurs. The spring is inserted as wound with the compression spring 16 inserted first and the wound locking spring inserted second. It is inserted until the compression spring 16 exerts on the fuel pellets F the designed force. For example, a total loading in the order of 7 pounds may be desired.

Once this total force is achieved, the locking spring 18 is unwound. When it is unwound it keys to the inside of the cladding F.

In the particular embodiment shown in FIG. 1, a getter has been placed at the end of the rod. Typically, the getter is given a diameter so that it fits into the inside diameter of the locking spring.

It can be seen that once the locking spring 18 is in place the pellets P are secured. End plug E may subsequently be welded at weld 14.

The winding, inserting and locking process of coil spring 18 can easily be understood. (See FIG. 2)

The installation tool includes a first outer cylinder 20 and inner cylinder 22. Outer cylinder 20 includes a slot 24 for receiving an end 34 of the coil spring. Lower cylinder 22 includes a slot 26. Slot 26 keys to an end 36 of the helical spring.

It can be seen that cylinder 22 has contacted at slot 26 the spring at protrusion 36. Similarly, cylinder 20 at slot 24 has contacted the spring at upper end 34.

Spiral winding of the helical spring has occurred. The winding has occurred in a direction which reduces the diameter of the spring 18. As wound the spring is shown inserted within a fuel rod F.

Referring to FIG. 1, the cylinders 20, 22 have been released. They have been allowed to rotate relative to one another.

Spring 18 has expanded. It has expanded in its outside diameter. In its expanded disposition, it has keyed to the inside walls of the fuel rod F. It is inserted so as to register on a scale S the spring force exerted on the fuel pellets.

It will be understood that in the simply illustrated process of insertion, and while the spring member 18 is wound, it will be possible to measure the compressive force against the fuel pellets. Simply stated, since the action of compression on the fuel pellets will have a reaction on the wound spring, the measurement of the reaction will enable a worker to accurately preload the fuel pellets in place.

Referring to FIG. 3 and FIG. 4, an additional embodiment is shown. In this embodiment the locking spring 18 and the compression spring 16 are constructed from continuous wire coils. In FIG. 3 the getter fits interior of the compression spring. In FIG. 4 the getter $G^2$ is located between the compression spring and the top of the fuel pellet column.

Referring to FIG. 5, the installation tool is shown for the embodiment in which the locking spring and the compression spring are constructed from continuous wire coils. A single piece fuel column retainer having locking coils 18 and compression coils 16 is illustrated together with the installation tool.

The installation tool consists of an outer cylinder 60 and an inner cylinder 62. The upper portion of the inner cylinder 62 has one diameter and the lower portion 64 has a smaller diameter. Tangs 64 at the bottom of the inner cylinder engage the washer 50 through the slot 52. The upper end of the locking spring 34 engages a slot 24 in the outer cylinder.

Prior to insertion in the fuel rod, the fuel column retainer is placed on the installation tool and is compressed to the desired axial load. Then the inner cylinder is rotated relative to the outer cylinder to wind the locking spring onto the large diameter portion of the inner cylinder 62. The tangs 64 engage the slot 52 and prevent rotation and axial movement of washer, thus maintaining the compressive load on the compression spring. The tool and retainer are inserted into the fuel rod until the washer 50 bears on the top of the fuel column, or getter. Then the inner cylinder is allowed to rotate relative to the outer cylinder. This allows the locking portion of the spring to partially unwind and bear against the fuel rod. The locking portion of the retainer now holds the compression portion in its compressed state and the tool can be withdrawn.

The reader will understand that numerous embodiments of this invention are possible. It will be understood that it is the two-part coil spring and the ability of one part to key to the inside diameter of the fuel rod F which is critical to the operation of this invention.

The reader will understand that although a single one-piece construction of the spring section 16, 18 is preferred, the apparatus will admit of the use of two separate springs. These two separate springs can be connected in any manner deemed expedient. For example, the getter can be use for such interconnection.

What is claimed is:

1. In a fuel rod construction including a fuel rod having an inside cylindrical diameter; cylindrical fuel pellets placed within said rod;

said cylindrical fuel pellets having a diameter less than the inside cylindrical diameter and being stacked end to end for a distance less than the length of said fuel rod inside said fuel rod;

Zircaloy end plugs for sealing said rod at either end;

a compression spring adjacent one end of the rods for biasing said pellets to and towards the other end of said rod, the improvement in said Zircaloy spring comprising:

a helical spring having at least a first small diameter helical portion and a second large diameter helical portion means interconnecting said first and second spring portions; said first small diameter helical portion having an outside diameter less than the inside diameter of fuel rod; said first helical spring portion compressed against the fuel pellets whereby the pellets are urged under force against the end of the rod remote from said spring;

the second spring portion having a normal outside diameter larger than the inside diameter of the fuel rod, said second helical spring portion keyed to the inside diameter of said fuel rod.

2. The invention of claim 1 and wherein said one of said helical portions enclosed a getter.

3. The invention of claim 1 and wherein said first and second spring portions are joined.

4. The invention of claim 3 and wherein said first and second spring portions are formed from a single piece of wire.

5. A process for securing fuel pellets to the inside diameter of a fuel rod comprising the steps of;

providing a cylindrical fuel rod having a preselected inside diameter;

closing one end of the fuel rod;

inserting cylindrical pellets, the pellets having an outside diameter less than the inside diameter of said fuel rod whereby said pellets may freely move;

providing a two-part helical spring, said spring having a portion with a first diameter less than the inside diameter of said fuel rod and a second portion with an outside diameter greater than the inside diameter of said fuel rod;

winding under torsion the second portion of said helical spring spirally to decrease the diameter of said helical spring to a diameter less than the inside diameter of the fuel rod;

compressing said fuel pellets with said compressive spring whereby a measured force of compression is exerted on the fuel pellets; and releasing the spiral wind on the second spring portion when said measured force is present whereby the second spring portion keys to the inside walls of said cylinder and maintains the fuel pellets in place.

6. The process of claim 5 and including the step of inserting a getter.

7. The invention of claim 5 and wherein said providing step providing a two part helical spring, the parts of said spring being joined one to another.

8. The invention of claim 7 and wherein said provided two part spring includes the step of forming said two part spring from a single piece of wire.

9. Apparatus for compressing fuel pellets in a fuel rod, the rod being opened at one end and sealed at the opposite end, said fuel pellets including cylindrical fuel pellets placed within the rod, said cylindrical fuel pellets having a diameter less than the inside cylindrical diameter and being stacked end to end a distance less than the length of said fuel rod inside said fuel rod;

at least one Zircaloy end plug for sealing the rod at one end;

a compression spring adjacent the other end of said rods for biasing said pellets to and towards the end of said rod, and an apparatus for the insertion of said spring, the improvement in said Zircaloy spring and apparatus for insertion comprising:

a helical spring having a first small diameter helical portion and a second large diameter helical portion;

means interconnecting said first and second spring portions;

said first small diameter helical portion having an outside diameter less than the inside diameter of said fuel rod, said first helical spring portion compressed to compress said fuel pellets between the sealed end of said rod and said spring;

the second spring portion having a normal outside diameter larger than the inside diameter of the fuel rod, said second helical spring portion for keying to the inside diameter of said fuel rod;

first and second members for helically winding said second spring portions, said first and second members configured to grasp said second spring portion at the respective ends thereof for winding said second portion from a diameter exceeding the inside diameter of said rod to a diameter less than the inside diameter of said rod whereby said members when released allow said spring to expand and key to the inside diameter of said rod.

10. The invention of claim 9 and including a washer attached to one end of said second spring member and wherein one of said winding members engaged said plug to wind said spring.

* * * * *